United States Patent
Vaidya et al.

(10) Patent No.: US 12,261,746 B2
(45) Date of Patent: *Mar. 25, 2025

(54) HIERARCHICAL API FOR A SDDC

(71) Applicant: VMware LLC, Palo Alto, CA (US)

(72) Inventors: Sachin Mohan Vaidya, Pune (IN); Mayur Dhas, Pune (IN); Naveen Ramaswamy, Pune (IN); Pavlush Margarian, Dublin, CA (US); Hamza Aharchaou, Redwood City, CA (US)

(73) Assignee: VMWare LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/211,360

(22) Filed: Jun. 19, 2023

(65) Prior Publication Data

US 2024/0031228 A1    Jan. 25, 2024

Related U.S. Application Data

(63) Continuation of application No. 17/692,634, filed on Mar. 11, 2022, now Pat. No. 11,689,425, which is a
(Continued)

(30) Foreign Application Priority Data

Jun. 15, 2018   (IN) .............................. 201841022438

(51) Int. Cl.
*H04L 41/08*     (2022.01)
*H04L 41/0806*   (2022.01)
*H04L 67/10*     (2022.01)

(52) U.S. Cl.
CPC ...... *H04L 41/0889* (2013.01); *H04L 41/0806* (2013.01); *H04L 67/10* (2013.01)

(58) Field of Classification Search
CPC .. H04L 41/0889; H04L 41/0806; H04L 67/10
(Continued)

(56) References Cited

U.S. PATENT DOCUMENTS 6,697,360 B1   2/2004   Gai et al.
6,765,914 B1   7/2004   Jain et al.
(Continued)

FOREIGN PATENT DOCUMENTS

AU   2004227600 B2   5/2009
CA      3107455 A1   2/2020
(Continued)

OTHER PUBLICATIONS

Author Unknown, "Assign Memory Resources to Containers and Pods," Oct. 17, 2020, 7 pages.
(Continued)

*Primary Examiner* — Lan Dai T Truong
(74) *Attorney, Agent, or Firm* — Quarles & Brady LLP

(57) ABSTRACT

Some embodiments of the invention provide a method for deploying software-implemented resources in a software defined datacenter (SDDC). The method initially receives a hierarchical API command that, in a declarative format, specifies several operation requests for several software-defined (SD) resources at several resource levels of a resource hierarchy in the SDDC. The method parses the API command to identify the SD resources at the plurality of resource levels. Based on the parsed API command, the method deploys the SD resources by using a deployment process that ensures that any first SD resource on which a second SD resource depends is deployed before the second resource. In some embodiments, a second SD resource depends on a first SD resource when the second SD resource is a child of the first SD resource. Alternatively, or conjunctively, a second SD resource can also depend on a first SD
(Continued)

resource in some embodiments when the second SD resource has some operational dependency on the first SD resource. In some embodiments, the method parses the API command by identifying several sets of SD resources, with each set having one or more SD resources at one resource level. The deployment in some embodiments deploys the identified SD resource sets at higher resource levels before deploying SD resources at lower resource levels.

20 Claims, 11 Drawing Sheets

Related U.S. Application Data continuation of application No. 16/945,727, filed on Jul. 31, 2020, now Pat. No. 11,277,309, which is a continuation of application No. 16/200,677, filed on Nov. 27, 2018, now Pat. No. 10,812,337.

(58) Field of Classification Search
USPC .................................................. 709/226
See application file for complete search history.

(56) References Cited

U.S. PATENT DOCUMENTS

| | | |
|---|---|---|
| 7,869,439 B1 | 1/2011 | Ramberg et al. |
| 7,890,543 B2 | 2/2011 | Hunt et al. |
| 7,912,955 B1 | 3/2011 | Machiraju et al. |
| 8,627,442 B2 | 1/2014 | Ji et al. |
| 8,683,560 B1 | 3/2014 | Brooker et al. |
| 9,152,803 B2 | 10/2015 | Biswas et al. |
| 9,225,638 B2 | 12/2015 | Jain et al. |
| 9,258,312 B1 | 2/2016 | O'Neill et al. |
| 9,531,590 B2 | 12/2016 | Jain et al. |
| 9,536,077 B2 | 1/2017 | Bignon et al. |
| 9,590,901 B2 | 3/2017 | Tubaltsev et al. |
| 9,594,546 B1 | 3/2017 | Todd et al. |
| 9,674,275 B1 * | 6/2017 | Engers .................. G06F 16/168 |
| 9,755,898 B2 | 9/2017 | Jain et al. |
| 9,774,537 B2 | 9/2017 | Jain et al. |
| 9,813,509 B1 | 11/2017 | Visser et al. |
| 9,825,810 B2 | 11/2017 | Jain et al. |
| 9,935,827 B2 | 4/2018 | Jain et al. |
| 9,979,641 B2 | 5/2018 | Jain et al. |
| 10,095,669 B1 | 10/2018 | Karppanen |
| 10,122,735 B1 | 11/2018 | Wohlgemuth |
| 10,129,077 B2 | 11/2018 | Jain et al. |
| 10,135,737 B2 | 11/2018 | Jain et al. |
| 10,193,977 B2 | 1/2019 | Ke et al. |
| 10,205,701 B1 | 2/2019 | Voss et al. |
| 10,225,137 B2 | 3/2019 | Jain et al. |
| 10,257,095 B2 | 4/2019 | Jain et al. |
| 10,270,796 B1 | 4/2019 | Veeraswamy et al. |
| 10,320,679 B2 | 6/2019 | Jain et al. |
| 10,341,233 B2 | 7/2019 | Jain et al. |
| 10,496,605 B2 | 12/2019 | Melnik et al. |
| 10,516,568 B2 | 12/2019 | Jain et al. |
| 10,547,521 B1 | 1/2020 | Roy et al. |
| 10,594,743 B2 | 3/2020 | Hong et al. |
| 10,609,091 B2 | 3/2020 | Hong et al. |
| 10,613,888 B1 | 4/2020 | Mentz et al. |
| 10,628,144 B2 | 4/2020 | Myneni et al. |
| 10,652,143 B2 | 5/2020 | Ravinoothala et al. |
| 10,693,782 B2 | 6/2020 | Jain et al. |
| 10,708,368 B1 | 7/2020 | Young et al. |
| 10,725,836 B2 | 7/2020 | Savenkov et al. |
| 10,795,909 B1 | 10/2020 | Bond et al. |
| 10,812,337 B2 | 10/2020 | Vaidya et al. |
| 10,841,226 B2 | 11/2020 | Mariappan et al. |
| 10,860,444 B2 | 12/2020 | Natanzon |
| 10,942,788 B2 | 3/2021 | Palavalli et al. |
| 10,944,691 B1 | 3/2021 | Raut et al. |
| 10,951,661 B1 | 3/2021 | Medan et al. |
| 10,972,341 B2 | 4/2021 | Mudigonda |
| 10,972,386 B2 | 4/2021 | Mackie et al. |
| 11,074,091 B1 | 7/2021 | Nayakbomman et al. |
| 11,086,700 B2 | 8/2021 | Myneni et al. |
| 11,159,366 B1 | 10/2021 | Gawade et al. |
| 11,190,491 B1 | 11/2021 | Kaciulis et al. |
| 11,194,483 B1 | 12/2021 | Dontu et al. |
| 11,277,309 B2 | 3/2022 | Vaidya et al. |
| 11,316,822 B1 | 4/2022 | Gawade et al. |
| 11,436,057 B2 | 9/2022 | Shen et al. |
| 11,500,688 B2 | 11/2022 | Liu et al. |
| 11,570,146 B2 | 1/2023 | Liu et al. |
| 11,606,254 B2 | 3/2023 | Liu et al. |
| 11,671,400 B2 | 6/2023 | Zhou et al. |
| 11,671,401 B2 | 6/2023 | Singh et al. |
| 11,689,425 B2 | 6/2023 | Vaidya et al. |
| 11,689,497 B2 | 6/2023 | Shen et al. |
| 11,748,170 B2 | 9/2023 | Palavalli et al. |
| 2004/0098154 A1 | 5/2004 | McCarthy |
| 2005/0129019 A1 | 6/2005 | Cheriton |
| 2007/0244962 A1 | 10/2007 | Laadan et al. |
| 2007/0245334 A1 | 10/2007 | Nieh et al. |
| 2007/0251998 A1 | 11/2007 | Belenki |
| 2010/0149996 A1 | 6/2010 | Sun |
| 2010/0177674 A1 | 7/2010 | Aggarwal |
| 2010/0211815 A1 | 8/2010 | Mankovskii et al. |
| 2010/0246545 A1 | 9/2010 | Berzin |
| 2010/0293378 A1 | 11/2010 | Xiao et al. |
| 2011/0161988 A1 | 6/2011 | Kashyap |
| 2011/0194494 A1 | 8/2011 | Aso et al. |
| 2011/0282936 A1 | 11/2011 | Chekhanovskiy et al. |
| 2011/0289508 A1 | 11/2011 | Fell et al. |
| 2012/0117226 A1 | 5/2012 | Tanaka et al. |
| 2012/0150912 A1 | 6/2012 | Ripberger |
| 2012/0304275 A1 | 11/2012 | Ji et al. |
| 2013/0018994 A1 | 1/2013 | Flavel et al. |
| 2013/0019314 A1 | 1/2013 | Ji et al. |
| 2013/0125230 A1 | 5/2013 | Koponen et al. |
| 2013/0174168 A1 | 7/2013 | Abuelsaad et al. |
| 2013/0266019 A1 | 10/2013 | Qu et al. |
| 2013/0283339 A1 | 10/2013 | Biswas et al. |
| 2014/0036730 A1 | 2/2014 | Nellikar et al. |
| 2014/0056298 A1 | 2/2014 | Vobbilisetty et al. |
| 2014/0129690 A1 | 5/2014 | Jaisinghani et al. |
| 2014/0164897 A1 | 6/2014 | Yucel et al. |
| 2014/0223556 A1 | 8/2014 | Bignon et al. |
| 2014/0237100 A1 | 8/2014 | Cohn et al. |
| 2014/0258479 A1 | 9/2014 | Tenginakai et al. |
| 2015/0063166 A1 | 3/2015 | Sif et al. |
| 2015/0081767 A1 | 3/2015 | Evens |
| 2015/0100704 A1 | 4/2015 | Davie et al. |
| 2015/0172093 A1 | 6/2015 | Kaneko et al. |
| 2015/0222598 A1 | 8/2015 | Koponen et al. |
| 2015/0249574 A1 | 9/2015 | Zhang |
| 2015/0263899 A1 | 9/2015 | Tubaltsev et al. |
| 2015/0263946 A1 | 9/2015 | Tubaltsev et al. |
| 2015/0317169 A1 | 11/2015 | Sinha et al. |
| 2015/0348044 A1 | 12/2015 | Smith |
| 2015/0379281 A1 | 12/2015 | Feroz et al. |
| 2016/0036860 A1 | 2/2016 | Xing et al. |
| 2016/0080422 A1 | 3/2016 | Belgodere et al. |
| 2016/0094454 A1 | 3/2016 | Jain et al. |
| 2016/0094457 A1 | 3/2016 | Jain et al. |
| 2016/0094650 A1 | 3/2016 | Rio |
| 2016/0094661 A1 | 3/2016 | Jain et al. |
| 2016/0182293 A1 | 6/2016 | Benedetto et al. |
| 2016/0217301 A1 | 7/2016 | Watanabe et al. |
| 2016/0239326 A1 | 8/2016 | Kaplan et al. |
| 2016/0241436 A1 | 8/2016 | Fourie et al. |
| 2016/0254964 A1 | 9/2016 | Benc |
| 2016/0269318 A1 | 9/2016 | Su et al. |
| 2016/0294612 A1 | 10/2016 | Ravinoothala et al. |
| 2016/0315809 A1 | 10/2016 | McMurry et al. |
| 2016/0335129 A1 | 11/2016 | Behera et al. |
| 2016/0337334 A1 | 11/2016 | Murr |
| 2017/0005923 A1 | 1/2017 | Babakian |
| 2017/0005986 A1 | 1/2017 | Bansal et al. |
| 2017/0031956 A1 | 2/2017 | Burk et al. |
| 2017/0063632 A1 | 3/2017 | Goliya et al. |

(56) References Cited

U.S. PATENT DOCUMENTS

| | | |
|---|---|---|
| 2017/0063782 A1 | 3/2017 | Jain et al. |
| 2017/0085561 A1 | 3/2017 | Han et al. |
| 2017/0093790 A1 | 3/2017 | Banerjee et al. |
| 2017/0171144 A1 | 6/2017 | Sagiraju et al. |
| 2017/0177394 A1 | 6/2017 | Barzik et al. |
| 2017/0195210 A1 | 7/2017 | Jacob et al. |
| 2017/0206034 A1 | 7/2017 | Fetik |
| 2017/0207963 A1 | 7/2017 | Mehta et al. |
| 2017/0286698 A1 | 10/2017 | Shetty et al. |
| 2017/0317954 A1 | 11/2017 | Masurekar et al. |
| 2017/0324781 A1 | 11/2017 | Hu et al. |
| 2017/0332307 A1 | 11/2017 | Pan |
| 2017/0353351 A1 | 12/2017 | Cheng et al. |
| 2017/0366416 A1 | 12/2017 | Beecham et al. |
| 2017/0374106 A1 | 12/2017 | Hamou et al. |
| 2018/0019969 A1 | 1/2018 | Murthy |
| 2018/0063194 A1 | 3/2018 | Vaidya et al. |
| 2018/0083835 A1 | 3/2018 | Cole et al. |
| 2018/0089299 A1 | 3/2018 | Collins et al. |
| 2018/0114012 A1 | 4/2018 | Sood et al. |
| 2018/0123943 A1 | 5/2018 | Lee et al. |
| 2018/0131675 A1 | 5/2018 | Sengupta et al. |
| 2018/0167453 A1 | 6/2018 | Luo |
| 2018/0167458 A1 | 6/2018 | Ould-Brahim et al. |
| 2018/0167487 A1 | 6/2018 | Vyas et al. |
| 2018/0183757 A1 | 6/2018 | Gunda et al. |
| 2018/0205605 A1 | 7/2018 | Mittal et al. |
| 2018/0234459 A1 | 8/2018 | Kung et al. |
| 2018/0248827 A1 | 8/2018 | Scharber et al. |
| 2018/0262424 A1 | 9/2018 | Roeland et al. |
| 2018/0287996 A1 | 10/2018 | Tripathy et al. |
| 2018/0295036 A1 | 10/2018 | Krishnamurthy et al. |
| 2018/0331885 A1 | 11/2018 | Raymond et al. |
| 2018/0359323 A1 | 12/2018 | Madden |
| 2019/0034237 A1 | 1/2019 | Siddappa et al. |
| 2019/0036868 A1 | 1/2019 | Chandrashekhar et al. |
| 2019/0042518 A1 | 2/2019 | Marolia et al. |
| 2019/0068500 A1 | 2/2019 | Hira |
| 2019/0068544 A1 | 2/2019 | Hao et al. |
| 2019/0079751 A1 | 3/2019 | Foskett et al. |
| 2019/0097879 A1 | 3/2019 | Cai et al. |
| 2019/0102280 A1 | 4/2019 | Caldato et al. |
| 2019/0103992 A1 | 4/2019 | Cidon et al. |
| 2019/0132220 A1 | 5/2019 | Boutros et al. |
| 2019/0132221 A1 | 5/2019 | Boutros et al. |
| 2019/0132283 A1 | 5/2019 | Ballard et al. |
| 2019/0140895 A1 | 5/2019 | Ennis, Jr. et al. |
| 2019/0140921 A1 | 5/2019 | Xu et al. |
| 2019/0149512 A1 | 5/2019 | Sevinc et al. |
| 2019/0149516 A1 | 5/2019 | Rajahalme et al. |
| 2019/0149518 A1 | 5/2019 | Sevinc et al. |
| 2019/0171650 A1 | 6/2019 | Botev et al. |
| 2019/0173780 A1 | 6/2019 | Hira et al. |
| 2019/0213004 A1 | 7/2019 | Zhu et al. |
| 2019/0229987 A1 | 7/2019 | Shelke et al. |
| 2019/0230126 A1 | 7/2019 | Kumar et al. |
| 2019/0238363 A1 | 8/2019 | Boutros et al. |
| 2019/0238364 A1 | 8/2019 | Boutros et al. |
| 2019/0245757 A1 | 8/2019 | Meyer et al. |
| 2019/0273683 A1 | 9/2019 | Jiang et al. |
| 2019/0288947 A1 | 9/2019 | Jain et al. |
| 2019/0306036 A1 | 10/2019 | Boutros et al. |
| 2019/0306086 A1 | 10/2019 | Boutros et al. |
| 2019/0356693 A1 | 11/2019 | Cahana et al. |
| 2019/0384645 A1 | 12/2019 | Palavalli et al. |
| 2019/0386877 A1 | 12/2019 | Vaidya et al. |
| 2020/0065080 A1 | 2/2020 | Myneni et al. |
| 2020/0065166 A1 | 2/2020 | Myneni et al. |
| 2020/0073692 A1 | 3/2020 | Rao et al. |
| 2020/0076684 A1 | 3/2020 | Naveen et al. |
| 2020/0076685 A1 | 3/2020 | Vaidya et al. |
| 2020/0076734 A1 | 3/2020 | Naveen et al. |
| 2020/0084112 A1 | 3/2020 | Kandaswamy et al. |
| 2020/0092275 A1 | 3/2020 | Seed et al. |
| 2020/0112504 A1 | 4/2020 | Osman |
| 2020/0213366 A1 | 7/2020 | Hong et al. |
| 2020/0250009 A1 | 8/2020 | Jaeger et al. |
| 2020/0250074 A1 | 8/2020 | Zhang et al. |
| 2020/0252376 A1 | 8/2020 | Feng et al. |
| 2020/0301801 A1 | 9/2020 | Hegde |
| 2020/0314006 A1 | 10/2020 | Mackie et al. |
| 2020/0314173 A1 | 10/2020 | Pahwa et al. |
| 2020/0344120 A1 | 10/2020 | Pianigiani et al. |
| 2020/0366558 A1 | 11/2020 | Vaidya et al. |
| 2020/0374186 A1 | 11/2020 | Scott |
| 2020/0379812 A1 | 12/2020 | Ranjan et al. |
| 2020/0382556 A1 | 12/2020 | Woolward et al. |
| 2020/0382584 A1 | 12/2020 | Basavaiah et al. |
| 2020/0401457 A1 | 12/2020 | Singhal et al. |
| 2020/0403853 A1 | 12/2020 | Garipally et al. |
| 2020/0403860 A1 | 12/2020 | Lewis et al. |
| 2020/0409671 A1 | 12/2020 | Mazurskiy |
| 2021/0004292 A1 | 1/2021 | Zlotnick et al. |
| 2021/0064442 A1 | 3/2021 | Alluboyina et al. |
| 2021/0099335 A1 | 4/2021 | Li |
| 2021/0165695 A1 | 6/2021 | Palavalli et al. |
| 2021/0200814 A1 | 7/2021 | Tal et al. |
| 2021/0218652 A1 | 7/2021 | Raut et al. |
| 2021/0243164 A1 | 8/2021 | Murray et al. |
| 2021/0273946 A1 | 9/2021 | Iqbal et al. |
| 2021/0306285 A1 | 9/2021 | Hirasawa et al. |
| 2021/0311803 A1 | 10/2021 | Zhou et al. |
| 2021/0314190 A1 | 10/2021 | Liu et al. |
| 2021/0314239 A1 | 10/2021 | Shen et al. |
| 2021/0314240 A1 | 10/2021 | Liu et al. |
| 2021/0314300 A1 | 10/2021 | Shen et al. |
| 2021/0314361 A1 | 10/2021 | Zhou et al. |
| 2021/0314388 A1 | 10/2021 | Zhou et al. |
| 2021/0328858 A1 | 10/2021 | Asveren et al. |
| 2021/0349765 A1 | 11/2021 | Zhou et al. |
| 2021/0352044 A1 | 11/2021 | Asveren et al. |
| 2021/0365308 A1 | 11/2021 | Myneni et al. |
| 2021/0397466 A1 | 12/2021 | McKee et al. |
| 2021/0409336 A1 | 12/2021 | Talur et al. |
| 2022/0012045 A1 | 1/2022 | Rudraraju et al. |
| 2022/0035651 A1 | 2/2022 | Maurya et al. |
| 2022/0038311 A1 | 2/2022 | Shen et al. |
| 2022/0070250 A1 | 3/2022 | Baid et al. |
| 2022/0091868 A1 | 3/2022 | Malleni et al. |
| 2022/0158926 A1 | 5/2022 | Wennerström et al. |
| 2022/0182439 A1 | 6/2022 | Zhou et al. |
| 2022/0200865 A1 | 6/2022 | Vaidya et al. |
| 2022/0210113 A1 | 6/2022 | Pillareddy et al. |
| 2022/0278926 A1 | 9/2022 | Sharma et al. |
| 2022/0303246 A1 | 9/2022 | Miriyala et al. |
| 2022/0311738 A1 | 9/2022 | Singh et al. |
| 2022/0321495 A1 | 10/2022 | Liu et al. |
| 2022/0400053 A1 | 12/2022 | Liu et al. |
| 2023/0043362 A1 | 2/2023 | Kita et al. |
| 2023/0070224 A1 | 3/2023 | Huo et al. |
| 2023/0104568 A1 | 4/2023 | Miriyala et al. |
| 2023/0179484 A1 | 6/2023 | Liu et al. |
| 2023/0179573 A1 | 6/2023 | Sosnovich et al. |
| 2023/0231741 A1 | 7/2023 | Tang et al. |
| 2023/0231827 A1 | 7/2023 | Tang et al. |
| 2023/0244591 A1 | 8/2023 | Sun et al. |
| 2023/0297404 A1 | 9/2023 | Shen et al. |
| 2023/0300002 A1 | 9/2023 | Shen et al. |

FOREIGN PATENT DOCUMENTS

| | | | |
|---|---|---|---|
| CN | 105897946 | A | 8/2016 |
| CN | 106789367 | A | 5/2017 |
| CN | 107947961 | A | 4/2018 |
| CN | 108809722 | A | 11/2018 |
| CN | 110531987 | A | 12/2019 |
| CN | 1110611588 | A | 12/2019 |
| CN | 111327640 | A | 6/2020 |
| CN | 111371627 | A | 7/2020 |
| CN | 111865643 | A | 10/2020 |
| CN | 113141386 | A | 7/2021 |
| EP | 2464151 | A2 | 6/2012 |
| EP | 2464152 | A2 | 6/2012 |
| EP | 2830270 | A1 | 1/2015 |

(56) References Cited

FOREIGN PATENT DOCUMENTS

| | | |
|---|---|---|
| EP | 3316532 A1 | 5/2018 |
| EP | 3617879 A1 | 3/2020 |
| JP | 2011070707 A | 4/2011 |
| JP | 2012099048 A | 5/2012 |
| JP | 2014535213 A | 12/2014 |
| JP | 2015115043 A | 6/2015 |
| JP | 2018523932 A | 8/2018 |
| WO | 2011159842 A2 | 12/2011 |
| WO | 2013063330 A1 | 5/2013 |
| WO | 2016160523 A1 | 10/2016 |
| WO | 2018044341 A1 | 3/2018 |
| WO | 2018044352 A1 | 3/2018 |
| WO | 2019241086 A1 | 12/2019 |
| WO | 2020041073 A1 | 2/2020 |
| WO | 2020041074 A1 | 2/2020 |
| WO | 2021196080 A1 | 10/2021 |
| WO | 2022026028 A1 | 2/2022 |
| WO | 2022204941 A9 | 10/2022 |
| WO | 2023133797 A1 | 7/2023 |
| WO | 2023173404 A1 | 9/2023 |

OTHER PUBLICATIONS

Author Unknown, "NSX and Micro-segmentation," Jan. 3, 2017, 2 pages, retrieved from https://www.youtube.com/watch?v=1_QtISXaxkE.

Author Unknown, "NSX Policy API: Getting Started Guide," Technical White Paper, Sep. 2019, 28 pages, VMware, Inc.

Author Unknown, "VMware NSX for vSphere 6.4—Application Rule Manager Enhancements," Jan. 20, 2018, 2 pages, retrieved from https://www.youtube.com/watch?v=r3IKNkt5mi8.

Author Unknown, "VMware NSX-T 2.4: Advancing NSX Everywhere for Everyone," Feb. 27, 2019, 2 pages, retrieved from https://www.youtube.com/watch?v=lqPyRBWABHg.

Patni, Sanjay, "Pro RESTful APIs," Month Unknown 2017, 136 pages, Apress, New York City, NY, USA.

Abhashkumar, Anubhavnidhi, et al., "Supporting Diverse Dynamic Intent-based Policies Using Janus," CoNEXT 17, Dec. 12-15, 2017, 14 pages, ACM, Incheon, KR.

Abwnawar, Nasser, "A Policy-Based Management Approach to Security in Cloud Systems," Feb. 2020, 184 pages, De Monfort University, Leicester, UK.

Author Unknown, "Advanced Networking Features in Kubernetes and Container Bare Metal," Document 606835-001, Dec. 2018, 42 pages, Intel Corporation.

Author Unknown, "Chapter 4: Default Security Policy," IBM Security Access Manager Version 9.0, Oct. 2015, 18 pages.

Author Unknown, "Containers and Container Networking for Network Engineers: VMware NSX Container Networking," Jan. 2018, 58 pages, VMware, Inc.

Author Unknown, "E-Security Begins with Sound Security Policies," Jun. 14, 2001, 23 pages, Symantec Corporation.

Author Unknown, "Kubernetes Core Concepts for Azure Kubemetes Service (AKS)", Jun. 3, 2019, 6 pages, retrieved from https://docs.microsoft.com/en-us/azure/aks/concepts-clusters-workloads.

Author Unknown, "NSX vSphere API Guide—NSX 6.2 for vSphere," Jan. 6, 2017, 400 pages, VMware, Inc.

Author Unknown, "OpenShift Container Platform 4.6," Mar. 3, 2021, 41 pages, Red Hat, Inc.

Balla, David, et al., "Adaptive Scaling of Kubernetes Pods," NOMS 2020—2020 IEEE/IFIP Network Operations and Management Symposium, Apr. 20-24, 2020, 5 pages, IEEE, Budapest, Hungary.

Chawla, Harsh, et al., "Building Microservices Applications on Microsoft Azure: Designing, Developing, Deploying, and Monitoring," Month Unknown 2019, 271 pages, Harsh Chawla and Hemant Kathuria, India.

Darabseh, Ala, et al., "SDDC: A Software Defined Datacenter Experimental Framework," Proceedings of the 2015 3rd International Conference on Future Internet of Things and Cloud, Aug. 24-26, 2015, 6 pages, IEEE Computer Society, Washington, D.C., USA.

Non-published Commonly Owned U.S. Appl. No. 18/227,306, filed Jul. 28, 2023, 37 pages, VMware, Inc.

Qi, Shixiong, et al., "Assessing Container Network Interface Plugins: Functionality, Performance, and Scalability," IEEE Transactions on Network and Service Management, Mar. 2021, 16 pages, vol. 198, No. 1, IEEE.

Rouse, Margaret, "What is SDDC (software-defined data center)?—Definition from WhatIs.com," Mar. 2017, 5 pages, TechTarget.com.

Sayfan, Gigi, "Mastering Kubernetes: Automating container deployment and management," May 2017, 426 pages, Packt Publishing, Birmingham, UK.

Wodicka, Brent, "A Developer's Guide to Container Orchestration, Kubernetes, & AKS," Mar. 19, 2019, 5 pages, AIS, Reston, VA, USA.

* cited by examiner

```
{
    "resource_type":"Infra",
    "children":[
    {
        "resource_type":"ChildDomain",
        "Domain":{
            "id":"domain-1",
            "resource_type":"Domain",
            "description":"domain-1",
            "children":[
                {
                    "resource_type":"ChildGroup",
                    "Group":{
                        "resource_type": "Group",
                        "description"":"group-1 test group",
                        "id":"group-1",
                    }
                },
                {
                    resource_type":"ChildGroup",
                    "Group": {
                        "resource_type":"Group",
                        "description":"group-2",
                        "id":"group-2",
                    }
                },
                {
                    "resource_type":"ChildCommunicationMap",
                    "CommunicationMap":{
                        "id":"cmp1",
                        "resource_type":"CommunicationMap",
                        "description":"communication map",
                    ]
                }
            }
        }
    }
    ]
}
```

*Figure 1*

```
{
   "resource_type":"Infra",
   "children":[                                505
      {
         "resource_type":"ChildProvider", // Tier-0
         "Provider": {
          "resource_type": "Provider",
          "id": "tier-0",
          "display_name": "tier-0",
            "ha_mode": "ACTIVE_STANDBY",
            "transit_subnet": "10.1.2.0/24", "children":[                          510
            {
               "resource_type": "ChildBgpRoutingConfig", // Bgp
               "BgpRoutingConfig": {
                 "resource_type": "BgpRoutingConfig",
                 "id": "bgp",
                 "display_name": "bgp",
                 "path":"/infra/providers/tier-0/bgp",
                 "local_as_num": 65333
               }
            },
                                               515
            {
               "resource_type": "ChildL3Vpn", // L3Vpn
               "L3Vpn": {
                 "resource_type": "L3Vpn",
                 "id": "pa-tokyo-pb-vpn",
                 "display_name": "pa-tokyo-pb-vpn",
                 "path":"/infra/providers/tier-0/l3vpns/pa-tokyo-pb-vpn",
                 "local_address": "20.20.20.20",
                 "remote_private_address": "21.21.21.21",
                 "remote_public_address": "21.21.21.21",
                 "passphrases": ["default"],
                 "tunnel_digest_algorithms": ["AES_GMAC_128"],
                 "tunnel_encryption_algorithms": ["AES_GCM_128"],
                 "ike_digest_algorithms": ["SHA2_256"],
                 "ike_encryption_algorithms": ["AES_128"],
                 "enable_perfect_forward_secrecy": true,
                 "dh_groups": ["GROUP14"],
                 "ike_version": "IKE_FLEX",
                 "l3vpn_session": {
                    "resource_type": "PolicyBasedL3VpnSession",
                    "rules": [
                       {      ⟶  To Figure 5B
```

*Figure 5A*

From Figure 5A →

```
"id": "tokyo-policy-1",
"display_name": "tokyo-policy-1",
"sources" : [
  {
    "subnet": "10.0.1.0/24"
  },
  {
    "subnet": "10.0.2.0/24"
  },
  {
    "subnet": "10.0.3.0/24"
  }
],
"destinations": [
  {
    "subnet": "10.1.1.0/24"
  },
  {
    "subnet": "10.1.2.0/24"
  }
],
"action": "PROTECT",
"sequence_number": 0
          }
        ]
      }
    }
  }
]
      }
    }
  ]
}
```

```
{
    "resource_type": "Infra",
    "children": [                                   615
    {
       "resource_type": "ChildNetwork",
       "Network": {
        "resource_type": "Network",
        "id": "vmc_cgw",
        "provider": "/infra/providers/vmc_t0",
        "children": [                               620
          {
            "resource_type": "ChildSegment",
            "Segment": {
              "resource_type": "Segment",
              "id": "segment_1"
            }
          },                                        625
          {
            "resource_type": "ChildSegment",
            "Segment": {
              "resource_type": "Segment",
              "id": "segment_2"
            }
          }
        ]
       }
    },                                              605
    {
       "resource_type": "ChildProvider",
       "Provider": {
        "id": "vmc_t0",
        "resource_type": "Provider",
        "bgp_as_num": 0,
        "children": [                               610
          {
            "resource_type": "ChildProviderInterface",
            "ProviderInterface": {
              "resource_type": "ProviderInterface",
              "ls_id": "<external_ls_id>",
              "id": "xvpc",
              "edge_cluster_member_index": "0",
              "subnets": [
                {
                  "ip_addresses": [
                    "168.254.1.2"
                  ],
                  "prefix_len": "24"
                }
              ]
            }
          }
        ]
       }
    }
    ]
}
```

*Figure 6*

```
                                810
{                              /           805
"display_name": "WebAppTemplate",  815     /                                      800
   "description": "Policy Template",/                                             /
   "template_placeholders": [
     {                        820                 825
        "placeholder_id": "<external_ls_id>",
        "placeholder_message": "Specify an external logical switch to connect to interface."
     }
],
"template_body": {
   "resource_type": "Infra",
   "children": [              615
     {                        /
        "resource_type": "ChildNetwork",
        "Network": {
           "resource_type": "Network",
           "id": "vmc_cgw",
           "provider": "/infra/providers/vmc_t0",
           "children": [
             {                620
                "resource_type": "ChildSegment", /
                "Segment": {
                   "resource_type": "Segment",
                   "id": "segment_1"
                }
             },
             {                625
                "resource_type": "ChildSegment", /
                "Segment": {
                   "resource_type": "Segment",
                   "id": "segment_2"
                }
             }
           ]
        }
     },
                              605
     {                        /
        "resource_type": "ChildProvider",
        "Provider": {
           "id": "vmc_t0",
           "resource_type": "Provider",|
           "bgp_as_num": 0,
           "children": [              610
             {                        /
                "resource_type": "ChildProviderInterface",
                "ProviderInterface": {
                   "resource_type": "ProviderInterface",
                   "ls_id": "<external_ls_id>",
                   "id": "xvpc",
                   "edge_cluster_member_index": "0",
                   "subnets": [
                     {
                        "ip_addresses": [
                          "168.254.1.2"
                        ],
                        "prefix_len": "24"
                     }
                   ]
                }
             }
           ]
        }
     }
   ]
}
}
```

*Figure 8*

HIERARCHICAL API FOR A SDDC

CLAIM OF BENEFIT TO PRIOR APPLICATIONS

This application is a continuation application of U.S. patent application Ser. No. 17/692,634, filed Mar. 11, 2022, now published as U.S. Patent Publication 2022/0200865. U.S. patent application Ser. No. 17/692,634 is a continuation application of U.S. patent application Ser. No. 16/945,727, filed Jul. 31, 2020, now issued as U.S. Pat. No. 11,277,309. U.S. patent application Ser. No. 16/945,727 is a continuation application of U.S. patent application Ser. No. 16/200,677, filed Nov. 27, 2018, now issued as U.S. Pat. No. 10,812,337. U.S. patent application Ser. No. 16/200,677 claims benefit under 35 U.S.C. 119(a)-(d) to Indian Patent Application Serial No. 201841022438, entitled "HIERARCHICAL API FOR A SDDC", filed on Jun. 15, 2018. U.S. patent application Ser. No. 17/692,634, now published as U.S. Patent Publication 2022/0200865, U.S. patent application Ser. No. 16/945,727, now issued as U.S. Pat. No. 11,277,309, U.S. patent application Ser. No. 16/200,677, now issued as U.S. Pat. No. 10,812,337, and Indian Patent Application 201841022438 are herein incorporated in their entirety by reference for all purposes.

BACKGROUND

Today, software defined datacenters (SDDC) are an important part of private and public clouds. To deploy a resource in SDDC, user typically has to go through several sequential steps in a predefined order. Each of these steps is often implemented through one or more API (Application Programming Interface) commands generated through a graphical user interface or a command line interface.

This tedious sequential set of API commands is often required for both imperative API systems as well as intent-based API systems. The sequential nature of these operations is often required because when resources are associated, one set of resources has to be defined before other sets of resources (e.g., parent resources have to be created before child resources). Ideally, a user should not have to go through such a tedious approach, and instead should be able to create several or all of the software defined (SD) resources in one API command.

BRIEF SUMMARY

Some embodiments of the invention provide a method for deploying software-implemented resources in a software defined datacenter (SDDC). The method initially receives a hierarchical API command that, in a declarative format, specifies several operation requests for several software-defined (SD) resources at several resource levels of a resource hierarchy in the SDDC. The method parses the API command to identify the SD resources at the plurality of resource levels. Based on the parsed API command, the method deploys the SD resources by using a deployment process that ensures that any first SD resource on which a second SD resource depends is deployed before the second resource.

In some embodiments, a second SD resource depends on a first SD resource when the second SD resource is a child of the first SD resource. Alternatively, or conjunctively, a second SD resource can also depend on a first SD resource in some embodiments when the second SD resource has some operational dependency on the first SD resource. In some embodiments, the method parses the API command by identifying several sets of SD resources, with each set having one or more SD resources at one resource level. The deployment in some embodiments deploys the identified SD resource sets at higher resource levels before deploying SD resources at lower resource levels.

Examples of SD resources that can be specified in the hierarchical API command include SD forwarding elements (e.g., managed software switches and routers, logical switches and routers implemented by the managed software switches and routers, etc.), SD compute elements (e.g., virtual machines, containers, etc.), SD service middlebox modules (e.g., service VMs or modules that perform middlebox service operations such as firewall operations, load balancing operations, network address translation operations, encryption operations, intrusion detection operations, intrusion prevention operations, etc.).

In some embodiments, an API processing system processes the API command. This command can include a set of parameters to update an earlier deployed SD resource. When this is the case, the API processing system deploys the SD resources by updating the earlier deployed SD resource based on a set of parameters specified in the parsed API command. In other cases, the API command includes a set of parameters that define a new SD resource. In such a case, the API processing system deploys the SD resource by deploying the SD resource based on the set of parameters specified in the parsed API command.

In some embodiments, the hierarchical API command is processed as one atomic unit. Accordingly, the API processing system determines whether the identified SD resources in the hierarchical API command are deployable. If so, the API processing system sends a confirmation that the API command has been successfully processed to a source that produced the hierarchical API command. On the other hand, when one or more SD resources in the API command are not deployable, the API processing system sends a message that the API command has not been successfully processed to the source that produced the hierarchical API command.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings and the Claims is needed. Moreover, the claimed subject matters are not to be limited by the illustrative details in the Summary, the Detailed Description and the Drawings.

BRIEF DESCRIPTION OF FIGURES

The novel features of the invention are set forth in the appended claims. However, for purposes of explanation, several embodiments of the invention are set forth in the following figures.

FIG. 1 illustrates an example of a hierarchical API command.

FIGS. 5A-B illustrate another example of a hierarchical API.

FIG. 6 illustrates yet another example of a hierarchical API.

FIG. 8 illustrates a hierarchical API template that can be used to define the hierarchical API.

DETAILED DESCRIPTION

Figure 2:
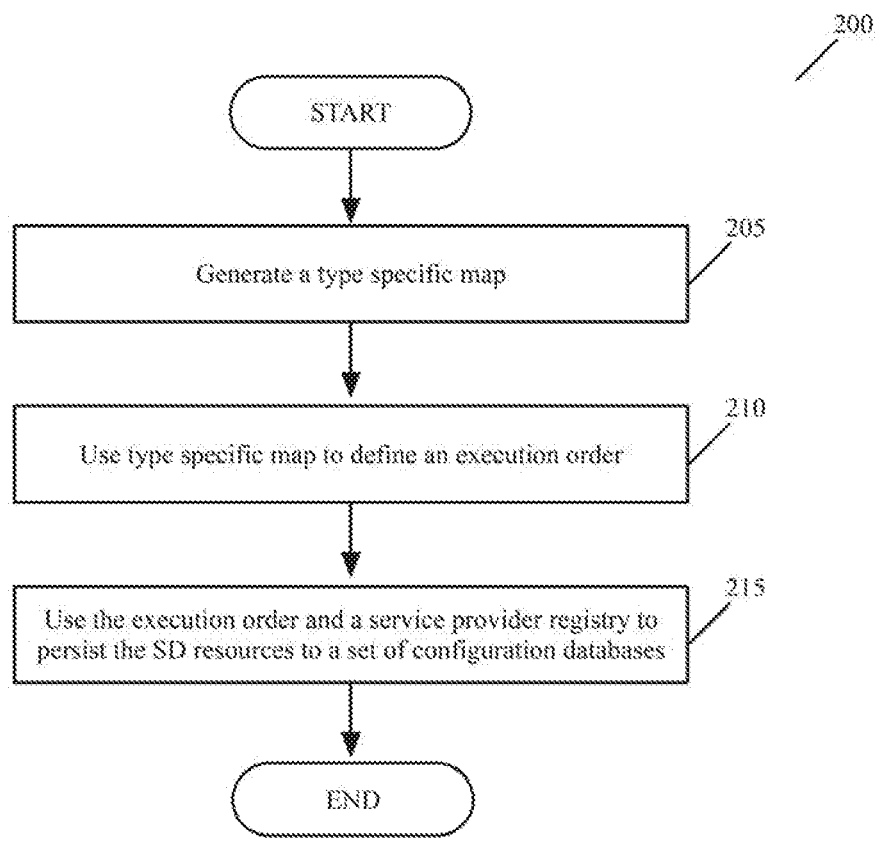
FIG. 2 illustrates a process that the API processing system of some embodiments performs to process a hierarchical API command that it receives.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for deploying software-implemented resources in a software defined datacenter (SDDC). The method initially receives a hierarchical API command that, in a declarative format, specifies several operation requests for several software-defined (SD) resources at several resource levels of a resource hierarchy in the SDDC. The method parses the API command to identify the SD resources at the plurality of resource levels. Based on the parsed API command, the method deploys the SD resources by using a deployment process that ensures that any first SD resource on which a second SD resource depends is deployed before the second resource.

In some embodiments, a second SD resource depends on a first SD resource when the second SD resource is a child of the first SD resource. Alternatively, or conjunctively, a second SD resource can also depend on a first SD resource in some embodiments when the second SD resource has some operational dependency on the first SD resource. In some embodiments, the method parses the API command by identifying several sets of SD resources, with each set having one or more SD resources at one resource level. The deployment in some embodiments deploys the identified SD resource sets at higher resource levels before deploying SD resources at lower resource levels.

Examples of SD resources that can be specified in the hierarchical API command include SD forwarding elements (e.g., managed software switches and routers, logical switches and routers implemented by the managed software switches and routers, etc.), SD compute elements (e.g., virtual machines, containers, etc.), SD service middlebox modules (e.g., service VMs or modules that perform middlebox service operations such as firewall operations, load balancing operations, network address translation operations, encryption operations, intrusion detection operations, intrusion prevention operations, etc.).

Some embodiments of the invention are implemented by an intent-based API processing system that provides its users with a hierarchical API data model that allows the users to specify their intent (i.e., their SD resources) without worrying about the mechanics of persisting and realizing these resources. In some embodiments, the intent-based API system allows the users to define hierarchical API commands by using a declarative language that refers to a simplified hierarchical data model. Each hierarchical API command can define multiple SD resources at multiple resource levels in the SDDC without requiring earlier API commands to create certain SD resources before others. In fact, one hierarchical command can be used in some embodiments to define all the SD resources for one user (e.g., one tenant) of the SDDC (e.g., of a multi-tenant SDDC).

The API system of some embodiments leverages the hierarchy of the data model to provide a process for accepting, validating and realizing parts or the whole of the hierarchy in a single API invocation. This system leverages the inherent knowledge of the data model to identify dependencies and invoke the underlying services in the right order, both for persistence and realization of the intent. Also, all of the persistence is done in a single transaction, thus making sure that the entire intent is accepted as an atomic unit.

Accordingly, the API processing system determines whether the SD resources identified in the hierarchical API command are deployable. If so, the API processing system sends a confirmation that the API command has been successfully processed to a source that produced the hierarchical API command. On the other hand, when one or more SD resources in the API command are not deployable, the API processing system sends a message that the API command has not been successfully processed to the source that produced the hierarchical API command.

Hence, from a user's perspective, the hierarchical API command either succeeds or fails as a whole. Treating the hierarchical API command as one atomic unit is important from networking and security perspectives, as it ensure that unless all the necessary features are defined (e.g., security is defined) for the network, the network does not get realized. This atomic treatment of multiple, different SD resources has not been achievable in one API command to date. Instead, multiple commands have typically been used with the first command specifying a start of a series of transactions and an end command specifying the end of the series.

Once the API system determines that the SD resources in an API command are deployable, the API system uses an asynchronous process in some embodiments to deploy these resources (i.e., goes about realizing the user's intent) in the right order. More specifically, once a hierarchical API command is parsed and the user input regarding the SD resources is persisted to a database that stores the user's input as the desired state, the asynchronous realization process starts in some embodiments. This process works with one or more network, service or compute managers to deploy or update one or more network, service or compute resources based on a work order that is appropriate for the deployed resources.

FIG. 1 illustrates an example of a hierarchical API command 100. As shown, this command is expressed in a hierarchical JSON (Javascript Object Notation) format, but in other embodiments it can be expressed in other hierarchical formats such as XML (Extensible Markup Language) format. The hierarchical JSON format used is equivalent to a tree format. Each node of the tree corresponds to an SDDC resource and has a field that describes the resource type for that node. Each node has a special property that holds all the children for the node depicting the parent-child relationship. Child nodes can in turn have multiple children and this can go to any depth. Thus, each node can be a parent and a child at the same time (similar to a non-leaf node in a tree).

In FIG. 1, each node has a property "resource_type" that describes the node's type. Example types in some embodiments include Infra, Tenant, Domain, Group, CommunicationMap, CommunicationEntry, Provider, ProviderInterface, Network, Segment, LoadBalancer, etc. These are all different types of resources in a datacenter. A node can also have a property "Children" that holds all the children of the node. For instance, in FIG. 1, the node of type "Domain" is a child of type "Infra" and has three children of two different types, which are "Group" and "CommunicationMap"

In some embodiments, Tenant refers to a tenant in a multi-tenant SDDC, Domain is the workload under a tenant, CommunicationMaps are security policies, and CommunicationEntry are the rules under a security policy. In some embodiments, each SD resource can be identified with a unique path from the root with all taxonomical parents included in the path. For example, a /vmware specifies all resources associated with a tenant VMware. A path /vmware/domains/Outlook specifies all Outlook workloads for the tenant VMware. A path /vmware/domains/Outlook/communication-maps/web-profile specifies the web-profile of the Outlook workloads of the tenant VMware. A path
/vmware/domains/Outlook/communicationmaps/web-
  profile/communication-entries/open-browser-access
specifies the open browser access of Outlook workload of the tenant VMware. More generally, the format for the path for a security policy can be specified as: /<tenant-name>/domains/<workload-name>/communication-maps/<security-policy-name>/communication-entries/<rule-name>.

FIG. 2 illustrates a process 200 that the API processing system of some embodiments perform to process a hierarchical API command that it receives. As shown, the process 200 initially constructs (at 205) a type specific map for the API command. The type specific map stores each SD resource identified in the command according to its type. In some embodiments, the process performs a breadth-first traversal of the input API tree, classifies the input into different buckets based on the resource types, and stores the classified input in the type specific map.

Each key in the type specific map is a resource type, and the value for each key is a list of all resources of the specific type in the input API tree. Each node element is stored along with its parent. In sum, the input API tree is classified based on resource types, e.g., all domains in one bucket, all groups in another and so on. Below is the type specific map for the example illustrated in FIG. 1.

| Type Specific Map | |
|---|---|
| Domain | Domain 1 |
| Group | Group1, Group2 |
| Communication Map | cmp1 |

After generating the type specific map, the process 200 defines (at 210) an execution order for persisting the resources (SD resources) in the input API tree. In some embodiments, the execution order is a predefined ordered list of resource types. This list governs the order in which resources in the input tree should be persisted. If new type is introduced in the system, the execution order is dynamically updated to include the order for the new element. For the example of FIG. 1, a sample execution order would be (1) Domain, (2) Group, and (3) Communication Map. This means domains should be created first then the groups and then communication maps.

Next, at 215, the process 200 uses a service provider registry to persist the SD resources in the API tree. The service provider registry is a map of resource types to callback handlers. The callback handlers are registered for each type in the system. The responsibility of a callback handler is to persist the type for which it is registered. As further described below, the callback handlers are implemented by deployment plugins in some embodiments. A deployment plugin is a module that plugs into an API processing system to handle the persistence of changes requested by received APIs and the deployment of the persisted changes. After 215, the process ends.

Below is an example of a service provider registry for the above-mentioned example. As shown, in the above example there are three types in the API call and three callback handlers are registered. For instance, DomainPersistenceService is registered for type "Domain" to indicate that DomainPersistenceService needs to be invoked to persist domain type.

| Service Provider Registry | |
|---|---|
| Domain | DomainPersistenceService |
| Group | GrupPersistenceServie |
| CommunicationMap | CMPService |

Figure 3:
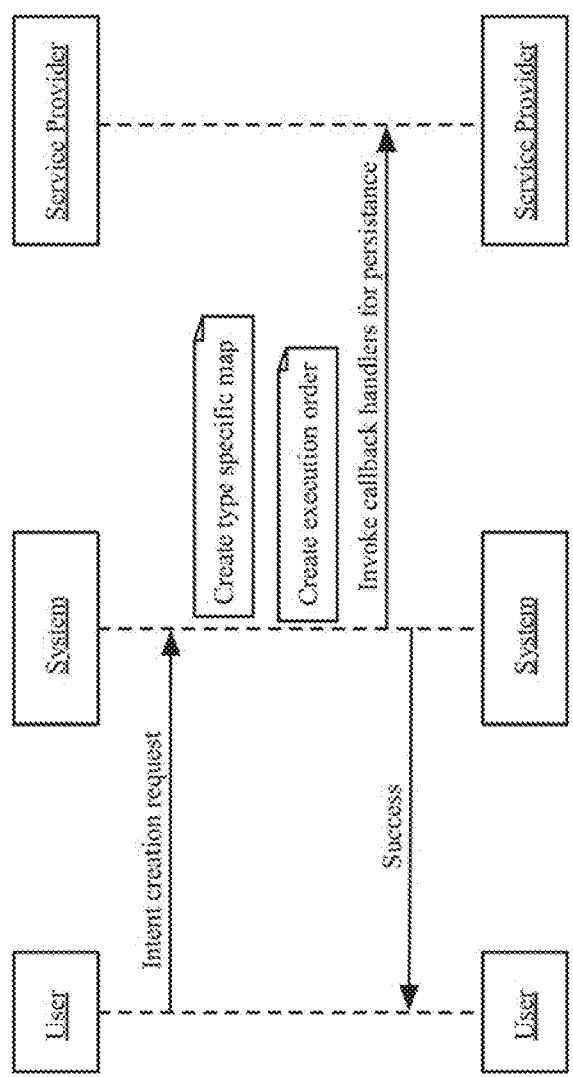
FIG. 3 illustrates an example of the workflow for processing a hierarchical API in some embodiments.

FIG. 3 illustrates an example of the workflow for processing a hierarchical API in some embodiments. In this workflow, the hierarchical API command is processed by the system to persist entire user intent in one shot. The entire process is done as part of a single transaction ensuring intent is created as a whole and failure in process does not result in partial intent creation.

As shown, the user initially invokes the system by providing a hierarchical API command that provides an intent tree with SD resources at one or more resource levels of the SDDC. Next, the type specific map is created from the input tree as described above. The invocation order is then specified. Based on this order, the callback handlers are invoked to persist resources in execution order. The API processing system then returns a notification to indicate that the API command has been successfully persisted to a set of one or more configuration databases. After this notification, the API processing system then interacts with one or more network, compute and/or service managers to deploy the SD resources that have been persisted to the set of configuration databases based on the input in the API call.

Figure 4:
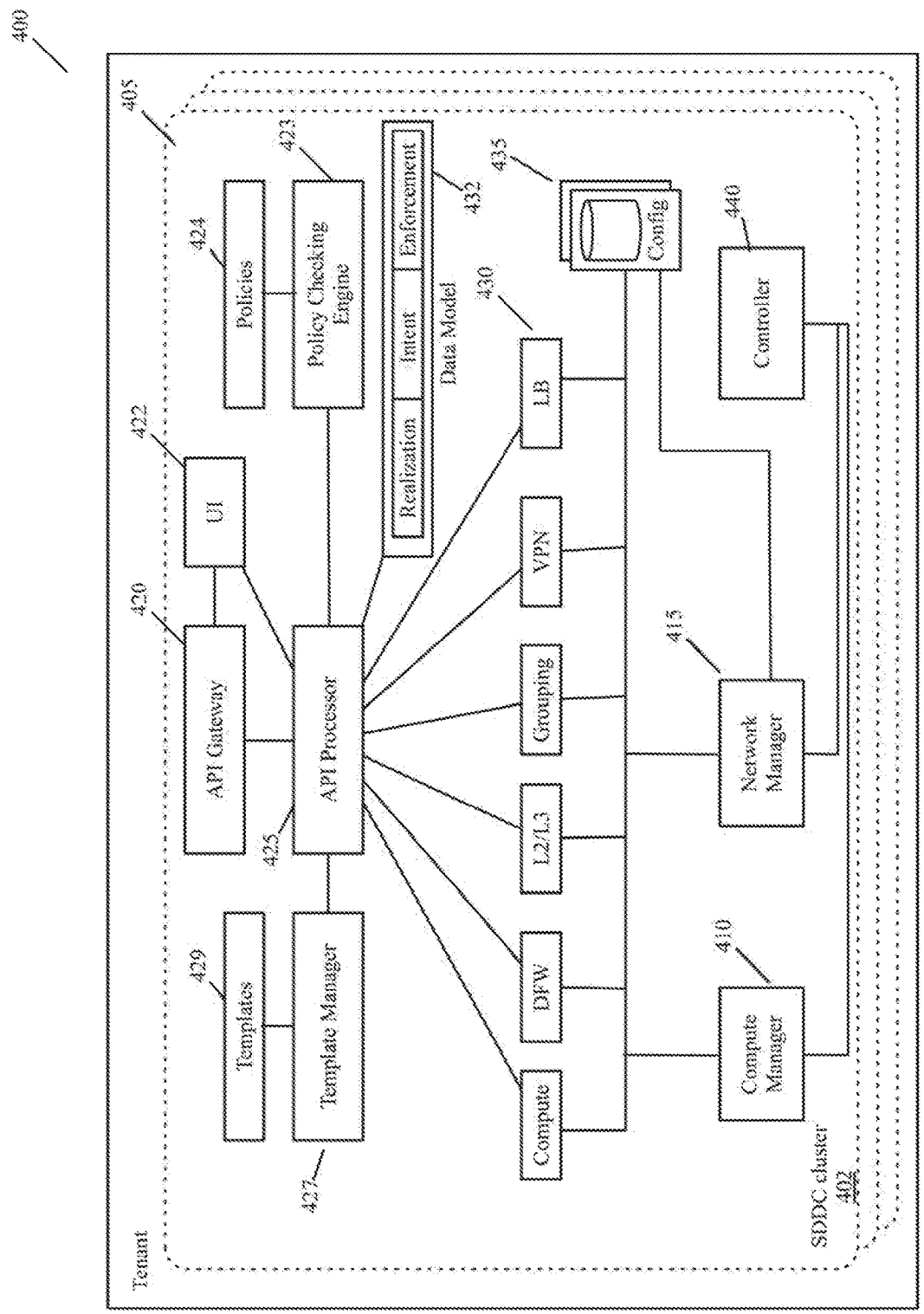
FIG. 4 illustrates an example of the API processing system of some embodiments of the invention.

FIG. 4 illustrates an example of the API processing system 400 of some embodiments of the invention. In this system, each tenant can create an SDDC cluster 402 that includes one or more SDDC instances 405, which can be considered to be separate environments. As shown, each SDDC instance 405 in some embodiments includes an API gateway 420, an API processor 425, a compute manager 410, a network manager 415, a controller 440, a template manager 427, a policy checker 423, a configuration data storage 435, and several deployment plugins 430.

In some embodiments, two or more of these components execute on two or more machines (e.g., VMs, containers, standalone servers, etc.) in one or more datacenters and communicate with each other through a network. In these or other embodiments, each SDDC instance includes multiple instances of each of these components for distributing the load and for high availability.

The compute manager 410 deploys and manages workload machines (e.g., workload VMs or containers). The network manager 415 on the other hand deploys network resources (e.g., software switches and routers) and middlebox service resources (e.g., service VMs and modules) in a datacenter. In some embodiments, the compute and network managers 410 and 415 use one or more controllers 440 to distribute the configuration data that is stored in one or more configuration data storages 435 to host computers, forwarding elements (e.g., software switches and routers executing on host computers, or standalone switches and routers), service machines (e.g., service VMs, service containers, other service modules, and standalone service appliances), and other resources in the SDDC.

The API gateway 420 redirects all API commands to the API service module 425, or to the UI manager 422 in some cases, based on URL patterns. The URL manager 422 processes API commands that are received through a graphical user interface and directs these commands to the API processor 425. The API processor 425 performs the processes illustrated in FIGS. 2 and 3 to ensure that the different requests that are part of a received hierarchical API are persisted to the configuration data storage(s) 435 and deployed in the correct order. The API processor 425 owns the user's desired state that it stores in its data storage 432. In some embodiments, the API processor 425 runs as a VM or container.

As shown, the API processor 425 in some embodiments uses the API template manager 427, which has access to several deployment templates that specify different API configurations for the SDDC resources. Through the template manager 427, users can select and modify a template (e.g., through API commands) to produce a complete hierarchical API. Based on this completed hierarchical API, the API processor 425 can then deploy, or update a previously deployed, set of SDDC resource, as further described below.

To deploy a resource, or update a previously deployed resource, based on a request in a received hierarchical API or a hierarchical API completed through the invocation of an API template with the required input, the API processor 425 in some embodiments parses the hierarchical API into one or more requests and uses the policy checking engine 423 to validate each request (i.e., to specify whether each request satisfies the constraints specified in the policies that are stored in the policy storage 424 and that are applicable to the resources referred to in the request).

In some embodiments, each policy in the policy storage 424 includes (1) a target that specifies a set of one or more datacenter resources to which the policy applies, and (2) an expression that specifies a constraint on operations on the specified resource set. The policies are expressed in a declarative format in some embodiments. Thus, for each request in a hierarchical API, the policy engine compares a set of attributes of the selected request's resource with a policy's target to determine whether the policy is applicable to the resource. After identifying one applicable policy, the policy checking engine determines whether the identified policy's expression specifies a constraint that requires the selected request to be rejected or allowed.

Through the deployment plugins 430, the API processor 425 persists the SD resources in the API calls in the configuration database 435. The deployment plugins 430 run as VMs or containers in some embodiments. Each plugin 430 is responsible for deploying one or more SD resource types. Examples of such types include data compute nodes (e.g., compute machines such as VMs or containers), distributed firewall rules, edge firewall rules, L2 and L3 forwarding elements (software switches and routers), security groups, VPN services, DHCP services, DNS services, load balancing services, etc.

To deploy these services, the plugins 430 interact with the computer manager 410 and the network manager 415, which, in turn, interact with one or more controllers 440.

Through these managers and controllers, the plugins 430 distribute configuration data from the persistent database 435 to host computers and standalone network/service devices in an SDDC in order to direct these computers and devices to deploy the desired SD resources.

In some embodiments, there is one desired state and orchestration service (i.e., API processing module) per SDDC instance. This is a highly available service that is deployed in some embodiments in the form of a container or a VM. This service accepts user's intent and performs orchestration across different services. This service also owns the details of the enforcement points (compute and network managers) to which the policies need to be pushed down.

The deployment plugins 430 provide the realization of the intent. As mentioned above, each of these plugins in some embodiments is deployed as a separate service running in a separate container or VM. In some embodiments, some services are packaged together in a single container, but run as separate services in terms of design and communication. Since the orchestration is performed by the desired state service, each of the plugin services in some embodiments exposes a set of REST API endpoints that would be invoked. Also, the desired state service in some embodiments serves as the common service that returns the state of the realized resources across different services. This is the case even though in some embodiments the realized state data is updated in the data store by the plugin services.

Thus, execution of hierarchical API results in creation of desired state in one go. If the system is able to validate and persist whole of intent, a notification is sent (e.g., an http status code 200 OK is returned) to the source of the hierarchical API. After the intent is created, notifications are generated. These notifications are consumed asynchronously by deployment plugins. The deployment plugins then take care of realizing the intent. Status of realization can be queried from the system using status APIs The API processing system 400 in some embodiments provides users with the ability to query the intent in hierarchical fashion. For instance, in some embodiments, the system provides a GET API that facilitates the reading of entire intent in one go. A special flag is passed in URL parameter to request GET in hierarchical fashion. When the parameter is not passed, the GET in some embodiment would work as normal GET and a single resource is returned. Hierarchical GET in some embodiments can work on the entire tree or the parts of the tree, i.e. it can specify the node from which the hierarchy is to be retrieved, as the hierarchical GET can work from any level within the tree.

Another aspect of hierarchical GET is filtering in some embodiments. An administrator in these embodiments can filter out the intent tree to see only the types that she is interested in. This filtering can be a simple type-based filtering, e.g., the administrator can say GET the intent hierarchy for type "Domain". In advanced filtering mechanism user can choose to retrieve intent based on features, e.g. the administrator can say GET all the resources in intent hierarchy related to firewall feature.

In some embodiments, user can perform hierarchical GET and club it with hierarchical POST. The administrator in some embodiments can retrieve the intent hierarchy, then modify and POST it back. This enables "import/export" use case. The administrator in some embodiments can also retrieve a hierarchical API and store it. Subsequently, the administrator can restore the previously retrieved intent.

FIGS. 5A-B illustrate another example of a hierarchical API. This API 500 has three operation requests 505-515 relating to a north-south router of an SDDC provider. A north-south router is a router that is placed at the north-south boundary of a physical or logical network of the SDDC in order to act as an ingress node to receive into this network packet from outside of the network or to supply from inside of the network packets to the outside of the network. The first request 505 is for the creation of the provider north-south router, the second request 510 is for defining the BGP services of this router, and the third request 515 is for defining the L3VPN services of this routers. As shown, the BGP and L3VPN services are defined as child resources of the north-south SDDC routers. Each request is defined in terms of the type of its associated resource as well as one or more other attributes of its associated resource.

Figure 7:
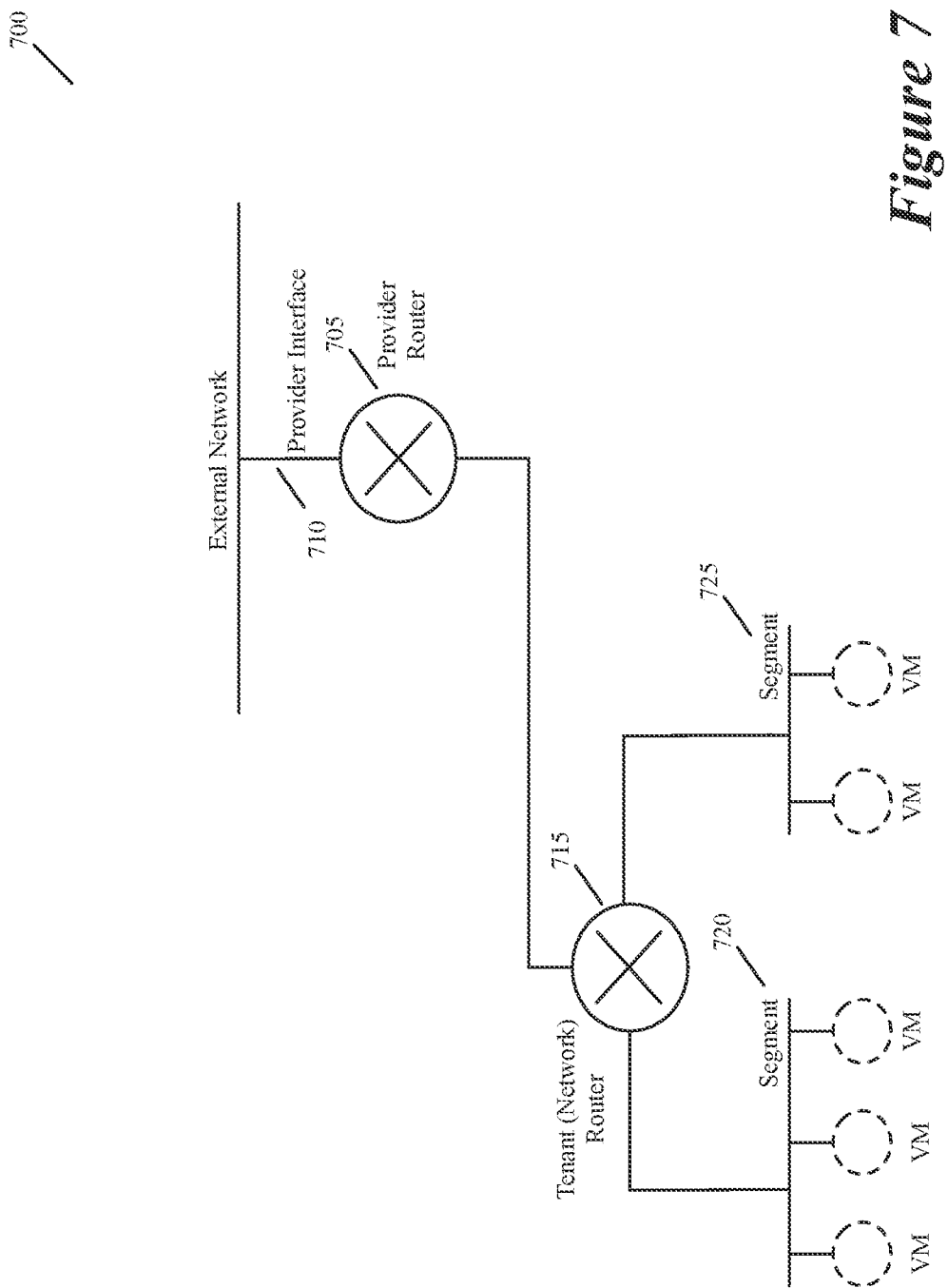
FIG. 7 illustrates the network components defined by the API of FIG. 6.

FIG. 6 illustrates another example of a hierarchical API. This API 600 has five operation requests 605-625 to define five associated resources in an SDDC. As illustrated in FIG. 7, these five resources are a provider north-south router 705, an uplink interface 710 for the provider router 705, a tenant router 715, and two L2 segments 720 and 725 in a network 700. The tenant router 715 connects the two L2 segments 720 and 725, which connect different sets of tenant workloads. In the example illustrated in FIG. 7, the workloads are illustrated as VMs. The illustration in this figure uses dashed lines to draw the VMs as the VMs are not specifically defined in the hierarchical API 600.

The requests 605-625 in FIG. 6 correspond to the similarly numbered resources 705-725 in FIG. 7. Specifically, the request 605 defines the north-south router 705, the request 610 defines an uplink interface 710, the request 615 defines a tenant router 715 and the requests 620 and 625 define two L2 segments 720 and 725. In the API 600, the tenant router 715 is referred to as the Network, while the provider router 705 is referred to as Provider.

FIG. 8 illustrates a hierarchical API template 800 that can be used to define the hierarchical API 600. As mentioned above, a template API provides a mechanism to specify a common set of requests that are often deployed together. The template API allows customers to deploy the common set of requests without having to define the API from scratch. To specify an actual API off of a template API, administrators just need to modify a limited number of fields called placeholder fields. From this perspective, a template API is a set of one or more requests (with respect to one or more resources) with blank fields or placeholders.

In some embodiments, the API template is a managed resource. It is represented by a list of placeholders and a body which is the API object. The API template 800 of FIG. 8 is a WebApp Template that defines the network components shown in FIG. 7 for a set of WebApp workloads. As shown, this template 800 includes the requests 605-625 of FIG. 6. It also includes a template header 805 that provides a name 810 and a description 815 of the template along with a placeholder list 820. In this example, the placeholder list only has one set of placeholder values. The placeholder value set 825 in this example identifies an external logical switch to connect to the interface.

In some embodiments, a template can be managed through GET, PATCH, DELETE, and POST commands. For instance, in some embodiments, a GET/policy/templates returns a list of template identifiers in the database. A GET /policy/templates/<template-id> in some embodiments returns the template for a specific template identifier. Also, in some embodiments, a PATCH /policy/templates followed by a template JSON definition creates a new template. A DELETE /policy/templates/<template-id> in some embodiments deletes a template given a specific template identifier.

A POST /policy/templates/<template-id>?action=deploy is specified in some embodiments to define and invoke a hierarchical API based on a template API. This command deploys a template given a specific template identifier <template-id>. Arguments that provide the values of the placeholders in the template will be passed in the body of the POST request. For instance, to specify a hierarchical API based on the template 800 of FIG. 8, the following POST command is provided in some embodiments.

```
POST /templates/<WebAppTemplate>?action-deploy
{
    "placeholders" : [
    {
        "parameter_id": "<external_ls_id>",
        "parameter_value": "LS5"
    }
    ]
}
```

In response to the POST command along with the placeholder arguments, the template manager 427 fetches the identified template, applies arguments that represent the placeholder values in order to define the hierarchical API, and then creates one or more request objects to identify each requested operation in the hierarchical API.

Figure 9:
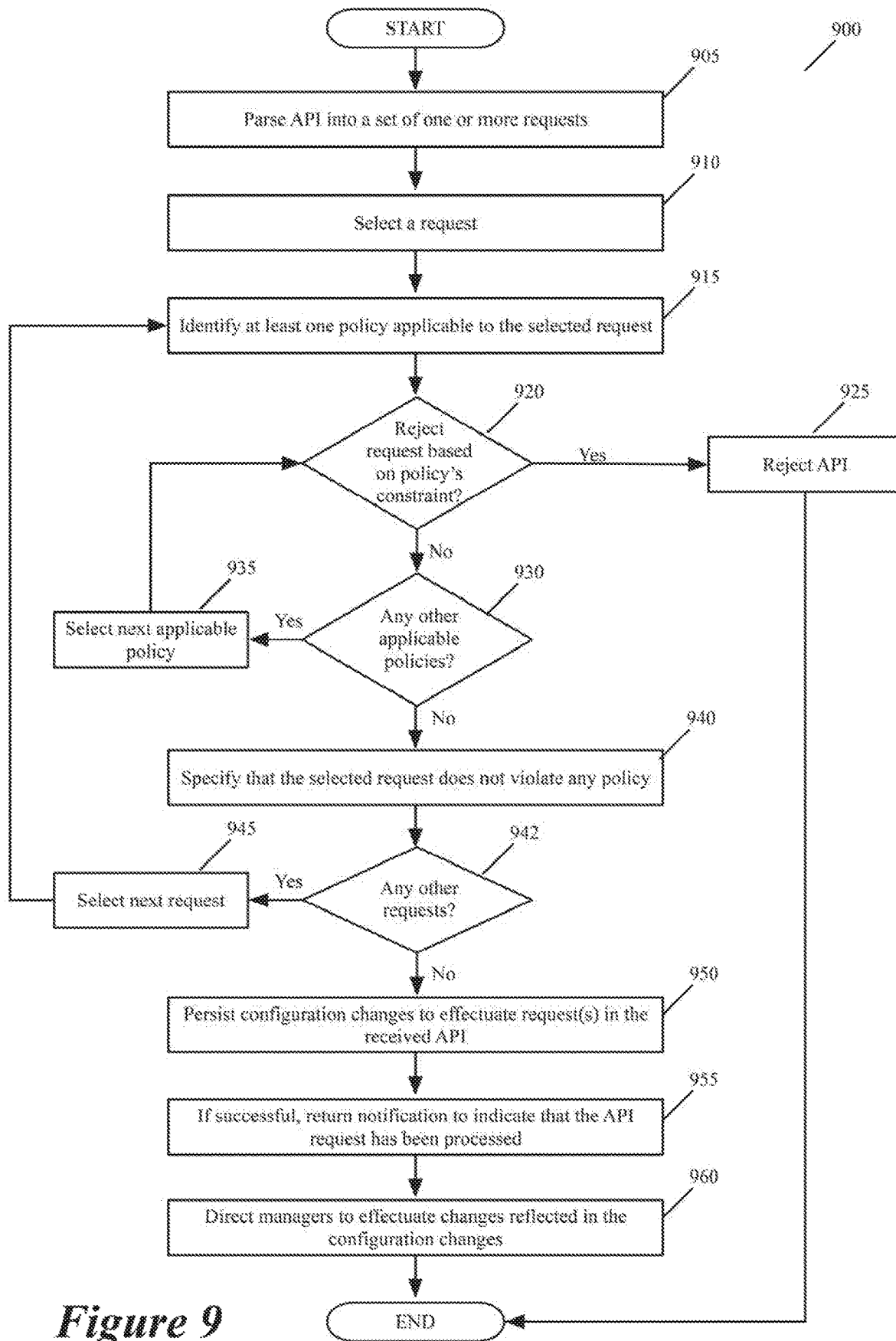
FIG. 9 illustrates a process that an API processor performs to process a hierarchical API regarding SD resources in the SDDC.

FIG. 9 illustrates a process 900 that the API processor 425 performs to process a hierarchical API regarding SD resources in the SDDC. The API processor 425 uses the policy checking engine 423 to perform this process. This policy checking engine and the declarative policies that it checks are further described in concurrently filed Indian Patent Application with the docket number E511. This concurrently filed application is incorporated herein by reference.

In the process 900, the API processor 425 initially parses (at 905) the hierarchical API into a set of one or more requests for one or more SD resources in the SDDC. In some embodiments, the API might not only include different requests for different resources, but also might include multiple requests for the one SD resource. The received API can in some embodiments just include multiple different requests for one SD resource. Each request specifies one operation to be performed on a resource in some embodiments, while in other embodiments a request can specify multiple operations to be performed on a resource.

After parsing the API into one or more requests, the API processor 425 calls the policy checking engine 423 to validate each request (i.e., to specify whether each request satisfies all the constraints in all the policies that are applicable to the SD resources referred to in the API). Hence, at 910, the API processor 425 selects a request parsed from the API. The API processor 425 then directs (at 915) the policy checking engine 423 to identify one or more policies that are applicable to the selected request.

Each request is associated with a resource in the resource hierarchy of the SDDC. As mentioned above, each resource can be the parent resource of several other child resources in the resource hierarchy in some embodiments. Also, as mentioned above, each policy includes in a declarative format (1) a target that specifies a set of one or more datacenter resources to which the policy applies, and (2) an expression that specifies a constraint on operations on the specified resource set. The target of each policy in some embodiments includes a resource type for the specified resource set and a path prefix that identifies the specified resource set in the resource hierarchy of the datacenter.

Thus, at 915, the policy checking engine 423 in some embodiments compares a set of attributes of the selected request's resource with a policy's target to determine whether the policy is applicable to the resource. Specifically, to identify a policy that is applicable to the selected request's resource, the policy checking engine 423 compares one or more attributes of the selected request (e.g., the identifier of the request's associated resource) with one or more attributes specified in the target (e.g., path prefix and resource type) of each policy stored in the policy storage 424 to identify a policy with a matching attribute set (i.e., with an attribute set that matches the selected request's attribute set).

When the first resource that is the target operation of the received request is at a particular level in the resource hierarchy, the policy checking engine in some embodiments identifies a policy associated with the first resource by comparing the request's set of attributes with attribute sets of policies specified for the first resource or parent resources of the first resource on the resource hierarchy. For instance, for an API request to adjust web access to Outlook workloads, the policy checking engine 423 in some embodiments would identify policies specified for the Outlook workload, this workload's web-profile, and this workload's browser access as being applicable to the API request.

After identifying one applicable policy, the policy checking engine determines (at 920) whether the identified policy's expression specifies a constraint that requires the selected request to be rejected. To make this determination, the policy checking engine compares the attribute set of the selected request (e.g., data message flow attributes when the request relates to forwarding operations or service operations on data message flows between machines in the SDDC, deployment attributes when the request relates to deployment of machines or network elements, etc.) with attributes that are specified for the constraint in the applicable policy's expression to ascertain whether the selected request violates the policy's constraint.

Thus, while comparing the selected request's resource attribute set with the targets of policies to identify the applicability of the policies to the resource, the policy checking engine 423 compares the resource's attribute set with the expressions of the applicable policies to determine whether the request should be allowed or rejected. Examples of requested operations on target resources in some embodiments include creation or modification of forwarding rules for forwarding data messages, creation or modification of service rules for performing middlebox service operations on data messages, and deployments or modification of deployments of machine and/or network elements in the datacenter.

When the policy checking engine 423 determines (at 920) that the selected request violates the identified policy's constraint, it directs (at 925) the API processor 425 to reject the API and return a notification to the source of the API that it has been rejected. After the API processor 425 rejects the API, the process ends in some embodiments. In other embodiments, the process 900 does not end after it determines that the API violates at least one policy. In these embodiments, the API processor 425 directs the policy checking engine 423 to validate each request in the API so that it can provide a report to the API source to identify all the policies that the rejected API violated.

When the policy checking engine 423 determines (at 920) that the selected request does not violate the identified policy's constraint, it determines (at 930) whether any other policy in the policy store 424 is applicable to the selected request. If so, this engine 423 selects (at 935) this policy and transitions back to 920 to determine whether this policy's expression specifies a constraint that the request violates. The process loops through 920-935 so long as it can find policies that are applicable to the request and that it has not yet processed. This looping ends when the engine 423 identifies a policy that has a constraint that the request violates, or when the engine has finished analyzing policies that are applicable to the request.

When the policy checking engine 423 determines (at 930) that it has examined all policies that are applicable to the selected request, this engine informs (at 940) the API processor 425 that the selected request does not violate any policies. Next, at 942, the API processor 425 determines whether the API has any other parsed requests that have not yet been validated by the policy checking engine 423. If so, the API processor 425 selects (at 945) the next request and returns to 915 to direct the policy checking engine 423 to validate this newly selected request (i.e., to check whether this request violates any constraint of any policy that is applicable to the request).

When the API processor 425 determines (at 942) that the API has no other parsed requests that have not yet been validated by the policy checking engine 423, the API processing engine uses (at 950) one or more deployment plugins 430 to persist the configuration change needed for processing the request(s) of the processed hierarchical API (i.e., to specify or change previously specified configuration data regarding any resources affected by the API). These deployment engines specify or change previously specified configuration data in configuration data storage(s) 435.

Once the configuration data has been persisted to the configuration data storage(s) 435, the API processor 425 returns a notification to the source of the API to indicate that the API request has been processed. Next, at 960, the API processing engine directs one or more resource managers 410/415 to perform the operation(s) associated with the request(s) in the API. Instead of being directed by the API processing engine 425, the deployment plugins 430 direct the resource managers 410/415 in other embodiments to distribute new or modified configuration data sets from the configuration data storage(s) 435 to the resources.

In response to these notifications from the API processor 425 or the deployment plugins 430, the resource managers then perform the operation(s) associated with the request(s) in the API in these embodiments. A resource manager can perform its operation either by directly interacting with the datacenter resources (e.g., host computers) to define or modify the desired resource (e.g., firewall service machines or modules) or indirectly through local and/or remote controllers, which interact with the datacenter resources to define or modify the desired resources.

After 960, the process 900 ends.

Hierarchical API of some embodiments immensely simplifies user workflow to express intent. It gives the following major benefits to user. The administrator does not have to care about order of creating elements. Also, the whole of intent is created atomically. Entire intent is created in a single API call.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
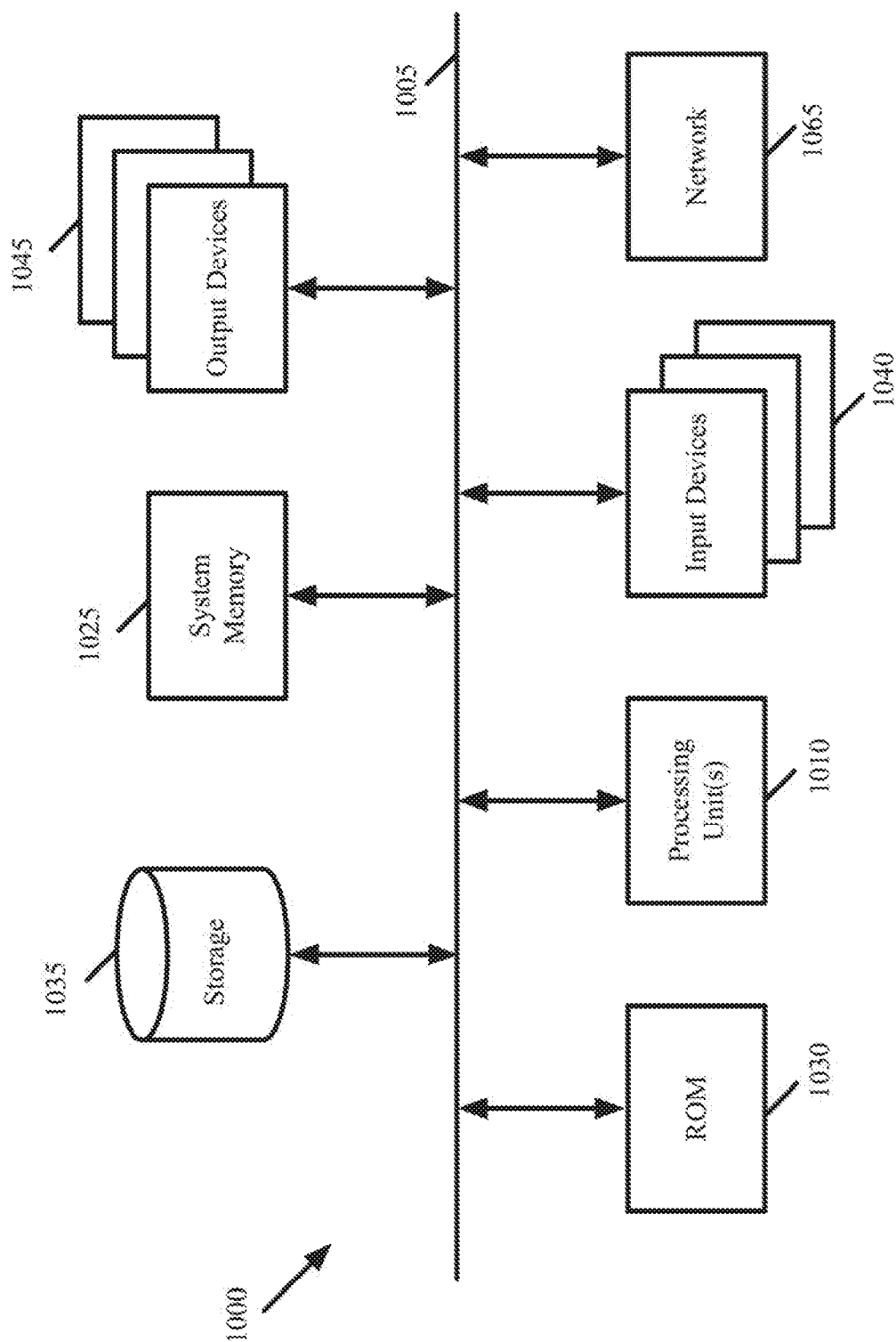
FIG. 10 conceptually illustrates a computer system with which some embodiments of the invention are implemented.

FIG. 10 conceptually illustrates a computer system 1000 with which some embodiments of the invention are implemented. The computer system 1000 can be used to implement any of the above-described hosts, controllers, and managers. As such, it can be used to execute any of the above described processes. This computer system includes various types of non-transitory machine readable media and interfaces for various other types of machine readable media. Computer system 1000 includes a bus 1005, processing unit(s) 1010, a system memory 1025, a read-only memory 1030, a permanent storage device 1035, input devices 1040, and output devices 1045.

The bus 1005 collectively represents all system, peripheral, and chipset buses that communicatively connect the numerous internal devices of the computer system 1000. For instance, the bus 1005 communicatively connects the processing unit(s) 1010 with the read-only memory 1030, the system memory 1025, and the permanent storage device 1035.

From these various memory units, the processing unit(s) 1010 retrieve instructions to execute and data to process in order to execute the processes of the invention. The processing unit(s) may be a single processor or a multi-core processor in different embodiments. The read-only-memory (ROM) 1030 stores static data and instructions that are needed by the processing unit(s) 1010 and other modules of the computer system. The permanent storage device 1035, on the other hand, is a read-and-write memory device. This device is a non-volatile memory unit that stores instructions and data even when the computer system 1000 is off. Some embodiments of the invention use a mass-storage device (such as a magnetic or optical disk and its corresponding disk drive) as the permanent storage device 1035.

Other embodiments use a removable storage device (such as a floppy disk, flash drive, etc.) as the permanent storage device. Like the permanent storage device 1035, the system memory 1025 is a read-and-write memory device. However, unlike storage device 1035, the system memory is a volatile read-and-write memory, such as random access memory. The system memory stores some of the instructions and data that the processor needs at runtime. In some embodiments, the invention's processes are stored in the system memory 1025, the permanent storage device 1035, and/or the read-only memory 1030. From these various memory units, the processing unit(s) 1010 retrieve instructions to execute and data to process in order to execute the processes of some embodiments.

The bus 1005 also connects to the input and output devices 1040 and 1045. The input devices enable the user to communicate information and select commands to the computer system. The input devices 1040 include alphanumeric keyboards and pointing devices (also called "cursor control devices"). The output devices 1045 display images generated by the computer system. The output devices include printers and display devices, such as cathode ray tubes (CRT) or liquid crystal displays (LCD). Some embodiments include devices such as touchscreens that function as both input and output devices.

Finally, as shown in FIG. 10, bus 1005 also couples computer system 1000 to a network 1065 through a network adapter (not shown). In this manner, the computer can be a part of a network of computers (such as a local area network ("LAN"), a wide area network ("WAN"), or an Intranet), or a network of networks (such as the Internet). Any or all components of computer system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims

What is claimed is:

1. A method of deploying software-implemented resources in a software defined datacenter, the method comprising:
   receiving a hierarchical API command that in a declarative format specifies a plurality of software-defined (SD) resources at a plurality of resource levels of a resource hierarchy in the datacenter;
   parsing the hierarchical API command to identify the plurality of SD resources at the plurality of resource levels; and
   based on the parsed hierarchical API command, deploying the SD resources by using a deployment process that ensures that any first SD resource on which a second SD resource depends is deployed before the second SD resource;
   wherein at least one SD resource further comprises an SD service module for performing a middlebox service operation, SD service operation including one of a firewall operation, a load balancing operation, a network address translation operation, an encryption operation, an intrusion detection operation, and an intrusion prevention operation.

2. The method of claim 1, wherein
   the parsing comprises identifying a plurality of sets of SD resources, each set having one or more SD resources at one resource level, and
   the deploying comprises deploying identified SD resource sets at higher resource levels before deploying SD resources at lower resource levels.

3. The method of claim 1, wherein at least one SD resource comprises an SD forwarding element.

4. The method of claim 3, wherein the SD resources further comprise workloads.

5. The method of claim 1, wherein the SD service module is a service machine.

6. The method of claim 1, wherein the SD service module is a service filter on a host machine.

7. The method of claim 1, wherein
   the hierarchical API command includes a set of parameters to update an earlier deployed SD resource, and
   deploying SD resource comprises updating the earlier deployed SD resource based on a set of parameters specified in the parsed hierarchical API command.

8. The method of claim 1, wherein
   the hierarchical API command includes a set of parameters that define a new SD resource, and
   deploying SD resource comprises deploying the SD resource based on the set of parameters specified in the parsed hierarchical API command.

9. The method of claim 1 further comprising sending, after determining that the identified SD resources are deployable, a confirmation that the hierarchical API command has been successfully processed to a source that produced the hierarchical API command.

10. The method of claim 1 further comprising:
    determining that one the SD resources cannot be deployed, and
    sending a message that the hierarchical API command has not been successfully processed to a source that produced the hierarchical API command.

11. A non-transitory machine readable medium storing a program for deploying software-defined (SD) resources in a software defined datacenter, the program comprising sets of instructions for:
    receiving a hierarchical API command that in a declarative format specifies a plurality of software-defined (SD) resources at a plurality of resource levels of a resource hierarchy in the datacenter;
    parsing the hierarchical API command to identify the plurality of SD resources at the plurality of resource levels; and
    based on the parsed hierarchical API command, deploying the SD resources by using a deployment process that ensures that any first SD resource on which a second SD resource depends is deployed before the second SD resource;
    wherein at least one SD resource further comprises an SD service module for performing a middlebox service operation, SD service operation including one of a firewall operation, a load balancing operation, a network address translation operation, an encryption operation, an intrusion detection operation, and an intrusion prevention operation.

12. The non-transitory machine readable medium of claim 11, wherein
    the set of instructions for parsing comprises a set of instructions for identifying a plurality of sets of SD resources, each set having one or more SD resources at one resource level, and
    the set of instructions for deploying comprises a set of instructions for deploying identified SD resource sets at higher resource levels before deploying SD resources at lower resource levels.

13. The non-transitory machine readable medium of claim 11, wherein at least one SD resource comprises an SD forwarding element.

14. The non-transitory machine readable medium of claim 13, wherein the SD resources further comprise workloads.

15. The non-transitory machine readable medium of claim 11, wherein the SD service module is a service machine.

16. The non-transitory machine readable medium of claim 11, wherein the SD service module is a service filter on a host machine.

17. The non-transitory machine readable medium of claim 11, wherein SD service operation include one of a firewall operation, a load balancing operation, a network address translation operation, an encryption operation, an intrusion detection operation, and an intrusion prevention operation.

18. The non-transitory machine readable medium of claim 11, wherein
    the hierarchical API command includes a set of parameters to update an earlier deployed SD resource, and
    the set of instructions for deploying SD resource comprises a set of instructions for updating the earlier deployed SD resource based on a set of parameters specified in the parsed hierarchical API command.

19. The non-transitory machine readable medium of claim 11, wherein
    the hierarchical API command includes a set of parameters that define a new SD resource, and
    the set of instructions for deploying the SD resource comprise a set of instructions for deploying the SD resource based on the set of parameters specified in the parsed hierarchical API command.

20. The non-transitory machine readable medium of claim 11, wherein the program further comprises a set of instructions for sending, after determining that the identified SD resources are deployable, a confirmation that the hierarchical API command has been successfully processed to a source that produced the hierarchical API command.

\* \* \* \* \*